(12) United States Patent
Kono et al.

(10) Patent No.: US 8,408,366 B2
(45) Date of Patent: Apr. 2, 2013

(54) DISK BRAKE

(75) Inventors: Kimiyasu Kono, Minami-Alpls (JP);
Keisuke Nanri, Minami-Alpls (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 224 days.

(21) Appl. No.: 13/069,940

(22) Filed: Mar. 23, 2011

(65) Prior Publication Data
US 2011/0240417 A1    Oct. 6, 2011

(30) Foreign Application Priority Data
Mar. 31, 2010  (JP) .................................. 2010-81741

(51) Int. Cl.
*F16D 55/02*  (2006.01)
(52) U.S. Cl. .................. 188/71.8; 188/72.4; 188/370
(58) Field of Classification Search .................. 188/71.8, 188/370, 72.4; 277/650, 944, 641, 642, 627
See application file for complete search history.

(56) References Cited

U.S. PATENT DOCUMENTS

| | | | | |
|---|---|---|---|---|
| 3,377,076 A | * | 4/1968 | Burnett ........................ | 277/582 |
| 4,156,532 A | | 5/1979 | Kawaguchi et al. | |
| 4,387,901 A | | 6/1983 | Ritsema | |
| 5,076,593 A | * | 12/1991 | Sullivan et al. ............. | 188/71.8 |
| 5,325,940 A | * | 7/1994 | Rueckert et al. ............. | 188/71.8 |
| 5,431,415 A | * | 7/1995 | Millonig et al. .............. | 277/649 |
| 6,244,393 B1 | * | 6/2001 | Weidenweber et al. ..... | 188/71.8 |

FOREIGN PATENT DOCUMENTS

| | | |
|---|---|---|
| DE | 32 47 052 | 6/1984 |
| EP | 1 643 152 | 4/2006 |
| JP | 2004-156651 | 6/2004 |

OTHER PUBLICATIONS

European Search Report (in English language) issued Jun. 30, 2011 in corresponding European Patent Application No. 11 15 9977.

* cited by examiner

*Primary Examiner* — Melanie Torres Williams
(74) *Attorney, Agent, or Firm* — Wendeorth, Lind & Ponack, LLP

(57) ABSTRACT

The bottom surface of a seal groove provided in a cylinder bore has a first slant portion and a second slant portion. A transition point between the first slant portion and the second slant portion is located closer to the opening of the cylinder bore than the center in the cylinder bore axial direction of the seal groove. A gap is formed between the outer peripheral surface of a piston seal member and the bottom surface of the seal groove, and the surface pressure applied to the bottom surface of the seal groove from the piston seal member is higher at the cylinder-bottom-side end of the piston seal member than at the cylinder-opening-side end thereof. Thus, it is possible to suppress the movement of the piston toward the cylinder bore bottom due to thermal expansion of the piston seal member.

20 Claims, 3 Drawing Sheets

DISK BRAKE

BACKGROUND OF THE INVENTION

The present invention relates to disk brakes for use in vehicles such as two- and four-wheeled vehicles.

In a disk brake, a seal member may be thermally expanded by heat generated between a disk rotor and a friction pad during braking, which is transmitted from the friction pad to the seal member through a piston in a caliper. The thermal expansion of the seal member forces the piston to retract toward the bottom of the cylinder bore. To reduce the amount of retracting movement of the piston, a technique has been disclosed in which the bottom surface of a seal groove where the seal member is provided is formed to have a diameter-increasing portion increasing in diameter toward the opening of the cylinder bore in the axial direction of the cylinder bore and a peripheral surface portion positioned closer to the bottom of the cylinder bore in the axial direction thereof than the diameter-increasing portion. The peripheral surface portion has a smaller angle to the axis of the cylinder bore than the diameter-increasing portion (see Japanese Patent Application Publication No. 2004-156651.

SUMMARY OF THE INVENTION

It is desirable for disk brakes to suppress the movement of the piston toward the bottom of the cylinder bore due to thermal expansion of the seal member, and it is demanded to further enhance the effect of suppressing the undesired retracting movement of the piston.

An object of the present invention is to provide a disk brake capable of suppressing the movement of the piston toward the bottom of the cylinder bore due to thermal expansion of the seal member.

To solve the above-described problem, the present invention provides a disk brake including brake pads disposed at sides opposite to each other across a disk rotor, a piston pressing the brake pad at least one side of the disk rotor against the disk rotor, a cylinder bore in which the piston is slidably fitted; a seal groove provided as an annular groove on the inner peripheral surface of a cylinder portion defining the cylinder bore, and a seal member having a rectangular sectional configuration. The seal member is fitted in the seal groove to seal between the piston and the cylinder bore. The seal groove has a bottom surface having a first slant portion extending and increasing in diameter from a cylinder-opening-side seal groove wall surface, which is closer to the opening of the cylinder bore, toward the bottom of the cylinder bore in the axial direction of the cylinder bore, and a second slant portion provided closer to the bottom of the cylinder bore than the first slant portion and decreasing in diameter from the first slant portion toward the bottom of the cylinder bore in the axial direction. A transition point between the first slant portion and the second slant portion is located closer to the opening of the cylinder bore than the center of the seal groove in the axial direction of the cylinder bore. When no pressure is applied to the piston fitted in the cylinder bore, a gap is formed between the outer peripheral surface of the seal member and the bottom surface of the seal groove, and a surface pressure applied to the bottom surface of the seal groove from the seal member at a cylinder-bottom-side end of the seal member, which is closer to the bottom of the cylinder bore, by abutment of the seal member against the second slant portion is higher than a surface pressure applied to the bottom surface of the seal groove from the seal member at a cylinder-opening-side end of the seal member, which is closer to the opening of the cylinder bore, by abutment of the seal member against the first slant portion.

An angle between the second slant portion and an axis of the cylinder bore may be larger than an angle between the first slant portion and the axis of the cylinder bore.

An first slant portion and the second slant portion may have a rectilinear cross-section in the axial direction of the cylinder bore.

An seal member may abut at least a part thereof against the cylinder-opening-side seal groove wall surface.

An seal groove may be so formed that, when the piston is fitted in the cylinder bore, an interference is provided at least an axial cylinder-bottom-side end portion of the outer peripheral surface of the seal member.

The seal groove may be so formed that, when the piston is fitted in the cylinder bore, interferences are provided at both axial end portions of the outer peripheral surface of the seal member.

The cylinder-opening-side seal groove wall surface of the seal groove may be slanted so that a gap between the cylinder-opening-side seal groove wall surface and a cylinder-opening-side side surface of the seal member, which is closer to the opening of the cylinder bore, increases from the bottom surface of the seal groove toward the opening of the cylinder bore.

The bottom surface of the seal groove may further have a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore.

The present invention further provides a disk brake comprising:

a piston pressing at least one of brake pads disposed at sides opposite to each other across a disk rotor;

a cylinder part having a cylinder bore in which the piston is slidably fitted; and a seal groove formed as an annular groove in the cylinder part to accommodate a seal member having a rectangular sectional configuration that seals between the piston and the cylinder bore, the seal member being accommodated with a gap between the seal member and a bottom surface of the seal groove;

the bottom surface of the seal groove having:

a first slant portion extending and increasing in diameter from an opening-side seal groove wall surface, which is closer to an opening of the cylinder bore, toward a bottom of the cylinder bore in an axial direction of the cylinder bore; and a second slant portion provided closer to the bottom of the cylinder bore than the first slant portion and decreasing in diameter from the first slant portion toward the bottom of the cylinder bore in the axial direction such that an angle between the second slant portion and an axis of the cylinder bore is larger than an angle between the first slant portion and the axis of the cylinder bore.

The first slant portion and the second slant portion may have a rectilinear cross-section in the axial direction of the cylinder bore.

The seal member may abut at least a part thereof against the cylinder-opening-side seal groove wall surface.

The seal groove may be so formed that, when the piston is fitted in the cylinder bore, an interference is provided at least an axial cylinder-bottom-side end portion of the outer peripheral surface of the seal member.

The seal groove may be so formed that, when the piston is fitted in the cylinder bore, interferences are provided at both axial end portions of the outer peripheral surface of the seal member.

The cylinder-opening-side seal groove wall surface of the seal groove may be slanted so that a gap between the cylinder-opening-side seal groove wall surface and a cylinder-opening-side side surface of the seal member, which is closer to the opening of the cylinder bore, increases from the bottom surface of the seal groove toward the opening of the cylinder bore.

The bottom surface of the seal groove further may have a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore.

The present invention further provides a disk brake comprising:

a cylinder bore having a piston slidably fitted therein through a seal member accommodated in a seal groove, the piston pressing one of brake pads disposed at sides opposite to each other across a disk rotor;

the seal groove having a bottom surface having:

a first slant portion extending and increasing in diameter from an opening-side seal groove wall surface, which is closer to an opening of the cylinder bore, toward a bottom of the cylinder bore in an axial direction of the cylinder bore; and a second slant portion provided closer to the bottom of the cylinder bore than the first slant portion and decreasing in diameter from the first slant portion toward the bottom of the cylinder bore in the axial direction such that an angle between the second slant portion and an axis of the cylinder bore is larger than an angle between the first slant portion and the axis of the cylinder bore;

wherein a transition point between the first slant portion and the second slant portion is located closer to the opening of the cylinder bore than a center of the seal groove in the axial direction of the cylinder bore and positioned at an axial center of the seal member as the seal member being placed to abut at least a part thereof against the cylinder-opening-side seal groove wall surface;

wherein, when no pressure is applied to the piston fitted in the cylinder bore, a gap is formed between an outer peripheral surface of the seal member and the bottom surface of the seal groove, and a surface pressure applied to the bottom surface of the seal groove from the seal member at a cylinder-bottom-side end of the seal member, which is closer to the bottom of the cylinder bore, by abutment of the seal member against the second slant portion is higher than a surface pressure applied to the bottom surface of the seal groove from the seal member at a cylinder-opening-side end of the seal member, which is closer to the opening of the cylinder bore, by abutment of the seal member against the first slant portion.

The first slant portion and the second slant portion may have a rectilinear cross-section in the axial direction of the cylinder bore.

The seal groove may be so formed that, when the piston is fitted in the cylinder bore, an interference is provided at least an axial cylinder-bottom-side end portion of the outer peripheral surface of the seal member.

The seal groove may be so formed that, when the piston is fitted in the cylinder bore, interferences are provided at both axial end portions of the outer peripheral surface of the seal member.

The bottom surface of the seal groove may further have a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore;

wherein an angle between the third slant portion and the axis of the cylinder bore is larger than an angle between the second slant portion and the axis of the cylinder bore.

DETAILED DESCRIPTION OF THE INVENTION

Figure 1:
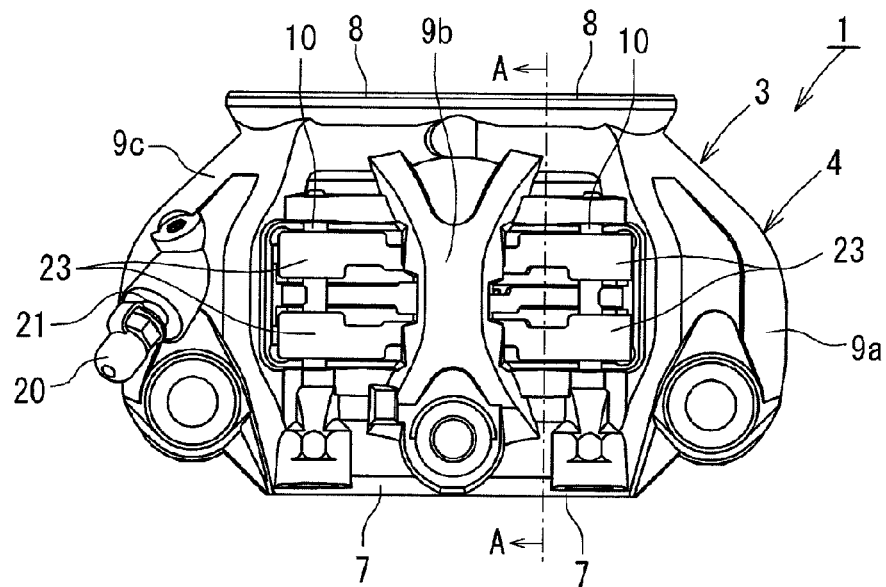
FIG. 1 is a top view of a caliper of a disk brake according to an embodiment of the present invention.
Figure 2:
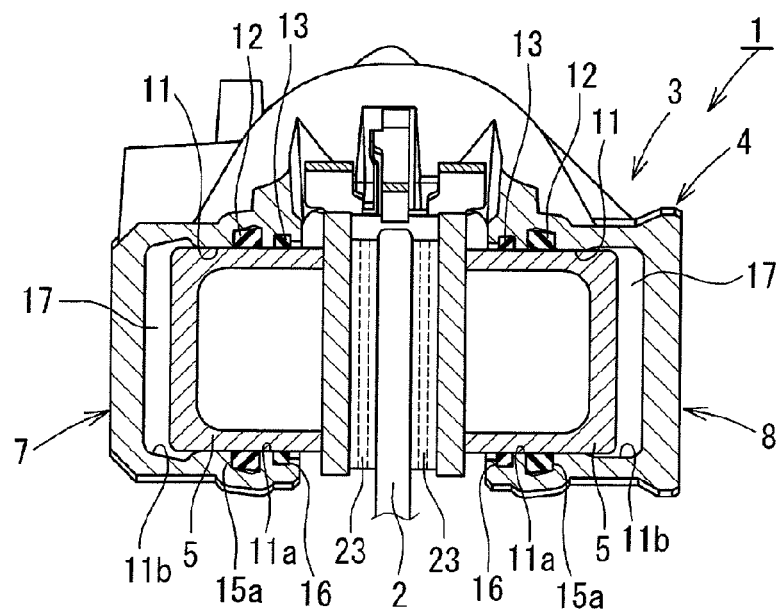
FIG. 2 is a sectional view taken along the line A-A in FIG. 1.

Embodiments of the present invention will be explained below in detail with reference to FIGS. 1 to 6. As shown in FIGS. 1 and 2, a disk brake 1 according to an embodiment of the present invention has a disk rotor 2 rotating together as one unit with a wheel to be braked. The disk brake 1 further has a caliper 3 applying a frictional resistance to the disk rotor 2. The caliper 3 is an opposed 4-piston caliper that has a caliper body 4 extending over the disk rotor 2 in the axial direction of the latter and secured to a non-rotating part of a vehicle (i.e. a stationary member non-rotatable with the wheel, e.g. a front fork of a motorcycle, or a knuckle member of an automobile). The opposed 4-piston caliper further has two pairs of pistons 5 slidably provided in the caliper body 4 such that the pistons 5 of each pair face each other across the disk rotor 2. It should be noted that the sectional view of FIG. 2 shows only one pair of pistons 5.

The caliper body 4 has, as shown in FIGS. 1 and 2, an outer cylinder portion 7 disposed at the outer side of the disk rotor 2 (i.e. at the side of the disk rotor 2 remote from the wheel) and an inner cylinder portion 8 disposed at the inner side of the disk rotor 2 (i.e. at the side of the disk rotor 2 closer to the wheel). The caliper body 4 further has three bridge portions 9a, 9b and 9c connecting together the outer cylinder portion 7 and the inner cylinder portion 8 at the radially outer side of the disk rotor 2. Further, the caliper body 4 has a pair of pad pins 10 spaced in the disk circumferential direction. The pad pins 10 extend between the outer cylinder portion 7 and the inner cylinder portion 8 along the disk axial direction.

The outer cylinder portion 7 and the inner cylinder portion 8 are provided with two pairs of cylinder bores 11 spaced from each other in the disk circumferential direction. The cylinder bores 11 of each pair are opposed to each other in the disk axial direction. Cup-shaped pistons 5 are slidably accommodated in the cylinder bores 11, respectively, such that the bottom of each piston 5 faces the bottom of the associated cylinder bore 11. It should be noted that the outer cylinder portion 7 and the inner cylinder portion 8 are provided with two pairs of pistons 5 spaced from each other in the disk circumferential direction such that the pistons 5 of each pair face each other across the disk rotor 2.

Each cylinder bore 11 has, as shown in FIG. 2, a small-diameter accommodating portion 11a slidably accommodating the associated piston 5 and a large-diameter accommodating portion 11b located closer to the bottom of the cylinder bore 11 and larger in diameter than the small-diameter accommodating portion 11a.

The small-diameter accommodating portion 11a of each cylinder bore 11 has seal grooves 15a and 16 formed on the inner peripheral surface thereof. The seal grooves 15a and 16 are annular grooves for accommodating a piston seal member 12 and a dust seal member 13, respectively, which seal between the inner peripheral surface of the small-diameter accommodating portion 11a and the outer peripheral surface of the piston 5. The seal groove 15a for piston seal is disposed substantially in the middle in the axial direction of the small-diameter accommodating portion 11a. The seal groove 16 for dust seal is disposed closer to the opening of the cylinder bore 11 than the seal groove 15a for piston seal. It should be noted that the disk brake 1 of this embodiment employs one of seal grooves 15a to 15c for piston seal according to first to third embodiments (described later). Thus, a closed fluid pressure chamber 17 is formed in a bottom portion of each cylinder bore 11 between the large-diameter accommodating portion 11b and the piston 5. The piston seal member 12 is a square ring made of an annular EPDM (Ethylene Propylene Diene Monomer) material having a rectangular sectional configuration, i.e. an oblong or square sectional configuration. In this embodiment, the piston seal member 12 is formed into an oblong sectional configuration.

The fluid pressure chambers 17 are supplied with a brake fluid pressure through supply passages (not shown) provided in the outer and inner cylinder portions 7 and 8, respectively. The supply of the brake fluid pressure causes the opposed pistons 5 to be synchronously propelled in the direction of projecting from the respective cylinder bores 11. Reference numeral 20 denotes a bleeder plug for air bleeding attached to an opening 21 communicated with the passages for supplying the brake fluid to the fluid pressure chambers 17.

As shown in FIGS. 1 and 2, each pad pin 10 of the caliper body 4 supports a pair of brake pads 23 movably in the disk axial direction. The brake pads 23 are disposed at both sides of the disk rotor 2 in the disk axial direction and pressed by the respective pistons 5 at their backs, which are surfaces not facing the disk rotor 2, thereby bringing the brake pads 23 into contact with the disk rotor 2.

Figure 3:
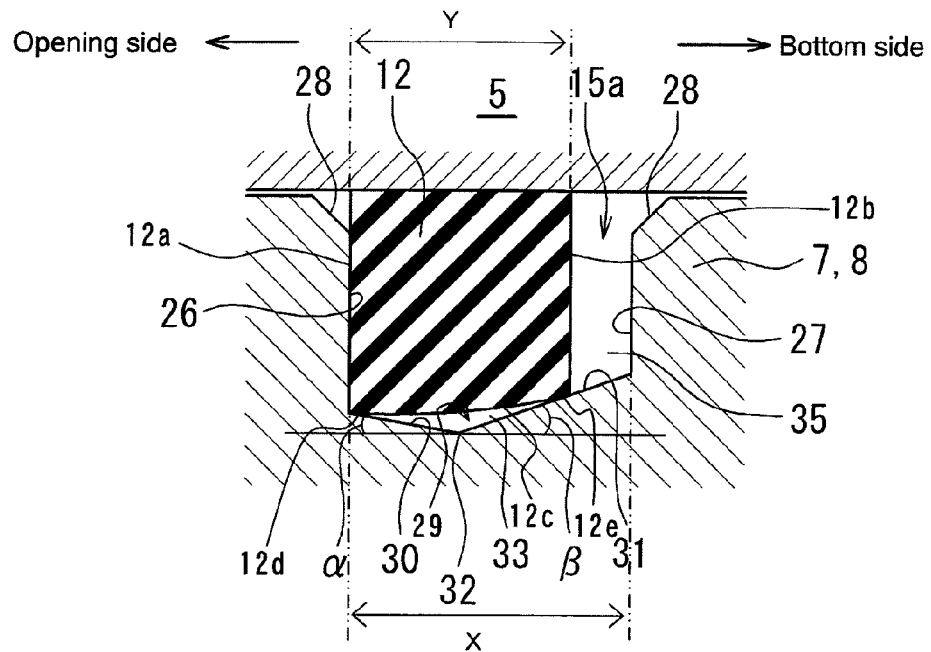
FIG. 3 is a sectional view showing the way in which a piston seal member is disposed in a seal groove according to a first embodiment of the present invention.
Figure 4:
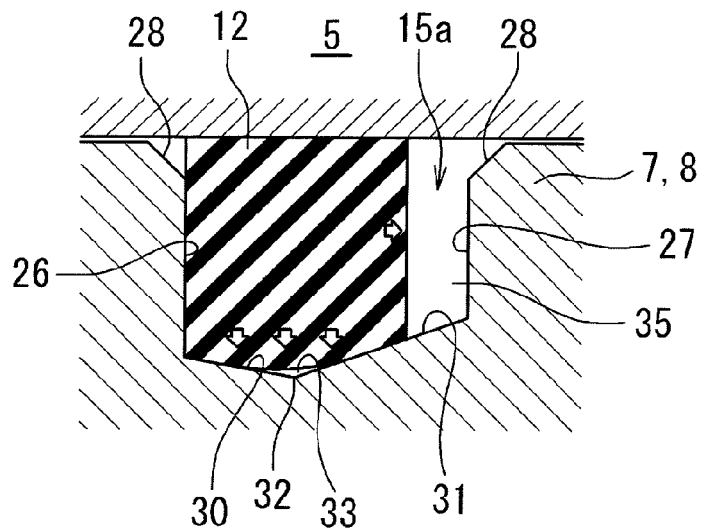
FIG. 4 is a sectional view showing the piston seal member as thermally expanded in the seal groove according to the first embodiment.

Next, the seal groove 15a for piston seal according to a first embodiment will be explained with reference to FIGS. 3 and 4 (referring also to FIGS. 1 and 2 appropriately). As shown in FIG. 3, the seal groove 15a according to the first embodiment comprises a cylinder-opening-side seal groove wall surface 26, which is closer to the opening of the cylinder bore 11, a cylinder-bottom-side seal groove wall surface 27, which is closer to the bottom of the cylinder bore 11, chamfers 28 formed on the piston-side wall surfaces of the seal groove wall surfaces 26 and 27, respectively, and a bottom surface 29. The cylinder-opening-side seal groove wall surface 26 and the cylinder-bottom-side seal groove wall surface 27 extend in the same direction as the radial direction of the cylinder bore 11. The distance between the seal groove wall surface 26 and the seal groove wall surface 27, i.e. the length X of the seal groove 15a in the axial direction of the cylinder bore 11, is longer than the axial length Y of the piston seal member 12. The piston seal member 12 has a cylinder-opening-side side surface 12a, which is closer to the opening of the cylinder bore 11. The cylinder-opening-side side surface 12a abuts against the cylinder-opening-side seal groove wall surface 26 of the seal groove 15a. The piston seal member 12 has a cylinder-bottom-side side surface 12b, which is closer to the bottom of the cylinder bore 11. A gap 35 is formed between the cylinder-bottom-side side surface 12b of the piston seal member 12 and the cylinder-bottom-side seal groove wall surface 27 of the seal groove 15a. The slant surfaces of the chamfers 28 are slanted at an angle of approximately 45° with respect to the cylinder bore axial direction. It should be noted that the chamfer 28 formed on the cylinder-opening-side seal groove wall surface 26 of the seal groove 15a is provided to perform a roll-back function, i.e. a function to return the piston 5, when the brake is released, toward the bottom of the cylinder bore 11 by a predetermined amount, which corresponds to a pad clearance formed between the disk rotor 2 and the brake pad 23 during non-braking operation.

The seal groove 15a according to the first embodiment has on the bottom surface 29 a first slant portion 30 having a rectilinear axial cross-section and a second slant portion 31 similarly having a rectilinear axial cross-section. The first slant portion 30 extends in a direction in which the diameter of the first slant portion 30 increases from the cylinder-opening-side seal groove wall surface 26 toward the bottom of the cylinder bore 11 in the axial direction thereof. The second slant portion 31 is provided closer to the cylinder bore bottom than and contiguously with the first slant portion 30 to extend in a direction in which the diameter of the second slant portion 31 decreases from a cylinder-bottom-side end of the first slant portion 30 toward the bottom of the cylinder bore 11 in the axial direction thereof as far as the cylinder-bottom-side seal groove wall surface 27. A transition point 32 between the first slant portion 30 and the second slant portion 31 is located closer to the cylinder bore opening than the center in the cylinder bore axial direction of the seal groove 15a, and the transition point 32 is positioned substantially at the center in the cylinder bore axial direction of the piston seal member 12.

When no brake fluid pressure is applied to the piston 5 fitted in the cylinder bore 11, a gap 33 of triangular sectional configuration is formed between the outer peripheral surface 12c of the piston seal member 12 and the bottom surface 29 (first and second slant portions 30 and 31) of the seal groove 15a. Moreover, when the piston 5 is fitted in the cylinder bore 11, the surface pressure applied to an end portion 12e of the piston seal member 12 from the second slant portion 31, which is closer to the cylinder bore bottom, is higher than the surface pressure applied to an end portion 12d of the piston seal member 12 from the first slant portion 30, which is closer to the cylinder bore opening.

Thus, the seal groove 15a according to the first embodiment is so formed that, when the piston 5 is fitted in the cylinder bore 11, interferences are provided for the piston seal member 12 at both the axial end portions 12d and 12e of the outer peripheral surface of the piston seal member 12. These interferences are set so that the interference at the cylinder-bottom-side end portion 12e is larger than the interference at the cylinder-opening-side end portion 12d. Although in this embodiment the seal groove 15a is so formed that interferences are provided at both the axial end portions 12d and 12e of the outer peripheral surface of the piston seal member 12, the present invention is not limited thereto. The arrangement may be such that an interference is provided at least the cylinder-bottom-side end portion 12e of the outer peripheral surface of the piston seal member 12 and that the cylinderopening-side end portion 12d simply abuts against the first slant portion 30 without an interference fit.

In the first embodiment, as shown in FIG. 3, the first and second slant portions 30 and 31 of the seal groove 15a are so formed that the angle β between the second slant portion 31 and the axis of the cylinder bore 11 is larger than the angle α between the first slant portion 30 and the axis of the cylinder bore 11. More specifically, the angle α between the first slant portion 30 and the axis of the cylinder bore 11 is set at a predetermined value in the range of from 0° to 24°. The angle α is preferably set at 10°. The angle β between the second slant portion 31 and the axis of the cylinder bore 11 is set at a predetermined value in the range of from 1° to 25°. The angle β is preferably set at 11°. By setting the angles α and β in this way, the piston seal member 12, when fitted into the seal groove 15a, is always forced toward the seal groove wall surface 26. Accordingly, there is no possibility of the piston seal member 12 being moved within the seal groove 15a by fluctuations of the fluid pressure in the fluid pressure chamber 17, which enables an improvement in brake feeling in the early stages of braking.

Regarding the transition point 32 between the first and second slant portions 30 and 31, when the length of the seal groove 15a in the cylinder bore axial direction is set at a predetermined value in the range of from 2.6 mm to 3.6 mm, the transition point 32 is offset from the lengthwise center of the seal groove 15a in the cylinder bore axial direction toward the opening of the cylinder bore 11 in the axial direction thereof by a predetermined value in the range of from 0.1 mm to 0.5 mm. The transition point 32 is preferably offset from the lengthwise center of the seal groove 15a in the cylinder bore axial direction toward the opening of the cylinder bore 11 in the axial direction thereof by 0.3 mm.

Although the first and second slant portions 30 and 31 provided on the bottom surface of the seal groove 15a according to the first embodiment are both rectilinear in axial cross-section, both the first and second slant portions 30 and 31 may be concavely or convexly curved. Alternatively, either of the first and second slant portions 30 and 31 may be curved. When at least one of the first and second slant portions 30 and 31 is concavely or convexly curved, the angle α between the axis of the cylinder bore 11 and the first slant portion 30 may be set as an angle between the axis of the cylinder bore 11 and a line segment from the transition point 32 to the cylinder-opening-side end portion 12d of the outer peripheral surface of the piston seal member 12. Similarly, the angle β between the axis of the cylinder bore 11 and the second slant portion 31 may be set as an angle between the axis of the cylinder bore 11 and a line segment from the transition point 32 to the cylinder-bottom-side end portion 12e of the outer peripheral surface of the piston seal member 12.

The following is an explanation of the operation of the disk brake 1 according to the embodiment of the present invention. In response to a braking operation performed by a driver, a master cylinder (not shown) supplies a brake fluid pressure to the fluid pressure chambers 17 in the outer and inner cylinder portions 7 and 8 of the caliper body 4. Consequently, all the pistons 5 are synchronously propelled to project toward the disk rotor 2 from the associated cylinder bores 11. The propulsion of the pistons 5 causes each pair of brake pads 23 to move toward each other and to contact the disk rotor 2 from both sides thereof. Thus, braking force is generated.

When the opposed pistons 5 are propelled toward each other, each piston seal member 12 is moved toward the opening of the cylinder bore 11 in the axial direction thereof by the fluid pressure in the fluid pressure chamber 17 and also by the force of interference fit between the piston seal member 12 and the piston 5 as the associated piston 5 is propelled toward the disk rotor 2. Consequently, each piston seal member 12 is elastically deformed to enter the gap defined by the chamfer 28 provided on the cylinder-opening-side seal groove wall surface 26, thus accumulating restoring force to return the piston 5 toward the cylinder bore bottom when the brake fluid pressure is released.

Thereafter, when the driver cancels the braking operation, the brake fluid pressure from the master cylinder is reduced, and the fluid pressure in the fluid pressure chambers 17 reduces to substantially the atmospheric pressure. Consequently, each piston 5 is moved by the restoring force of the associated piston seal member 12 toward the cylinder bore bottom through a predetermined distance corresponding to a pad clearance at which the elastic deformation of the piston seal member 12 is canceled. The movement of the pistons 5 causes the brake pads 23 to separate from the disk rotor 2, and the braking force is canceled.

Braking energy generated during the braking operation is converted into thermal energy, and high-temperature braking heat is generated in the disk rotor 2 and the brake pads 23. The braking heat is transmitted from each brake pad 23 to the piston seal member 12 through the piston 5, and the piston seal member 12 is thermally expanded by the braking heat.

Let us explain here the behavior of thermal expansion of the piston seal member 12 disposed in the seal groove 15a according to the first embodiment. As shown in FIG. 4, the seal groove 15a according to the first embodiment is provided with a gap 33 of triangular sectional configuration between the outer peripheral surface of the piston seal member 12 and the bottom surface 29 of the seal groove 15a, and the transition point 32 between the first and second slant portions 30 and 31 is offset toward the opening of the cylinder bore 11 in the axial direction thereof from the axial center of the seal groove 15a and set substantially at the axial center of the piston seal member 12. Moreover, the surface pressure applied to the bottom surface of the seal groove 15a from the piston seal member 12 is higher at the cylinder-bottom-side end of the piston seal member 12, which is closer to the bottom of the cylinder bore 11, than at the cylinder-opening-side end thereof, which is closer to the opening of the cylinder bore 11.

With the above-described configuration, when the disk brake 1 is placed in the cold state, i.e. substantially at ordinary temperature, after the heat generated during braking has dissipated, strain energy in the piston seal member 12 is accumulated toward the gap 33. As a result, when thermally expanded, the piston seal member 12 readily undergoes volume change toward the gap 33, which is radially outside of the piston seal member 12, and at the same time, the piston seal member 12 is suppressed from undergoing a volume increase toward the cylinder-bottom-side gap 35 in the axial direction of the piston seal member 12. That is, the volume increase due to thermal expansion of the piston seal member 12 is concentrated on the radially outer peripheral side, thereby suppressing the volume increase of the piston seal member 12 toward the bottom of the cylinder bore 11 in the axial direction thereof. Accordingly, it becomes possible to reduce the amount of movement of the piston 5 toward the cylinder bore bottom (fluid pressure chamber 17) when the piston seal member 12 is thermally expanded by braking heat. Thus, it is possible to suppress the movement of the piston 5 toward the cylinder bore bottom.

Further, in this embodiment, an interference is provided at least the cylinder-bottom-side end of the outer peripheral surface of the piston seal member 12. Therefore, strain energy in the piston seal member 12 is accumulated toward the opening of the cylinder bore 11 in the axial direction thereof. Accordingly, when thermally expanded, the piston seal member 12 is suppressed from undergoing a volume increase toward the cylinder-bottom-side gap 35 in the axial direction of the piston seal member 12. Thus, it is possible to reduce the amount of movement of the piston 5 toward the cylinder bore bottom, and it is possible to suppress the movement of the piston 5 toward the cylinder bore bottom.

Further, in the seal groove 15a according to the first embodiment, an interference is provided at the cylinder-opening-side end of the outer peripheral surface of the piston seal member 12. Therefore, when the piston seal member 12 cools off after cancellation of braking, the piston seal member 12 thermally shrinks toward the radial center from the radially outer peripheral side thereof by an amount corresponding to the volume increase by thermal expansion, which makes it possible to suppress the movement of the piston 5 toward the cylinder bore opening. Accordingly, it is possible to suppress the occurrence of what is called dragging, i.e. a phenomenon that the piston 5 is undesirably propelled by the piston seal member 12, causing the brake pad 23 to contact the disk rotor 2, despite the fact that no braking operation is performed after the piston seal member 12 has cooled down.

Figure 5:
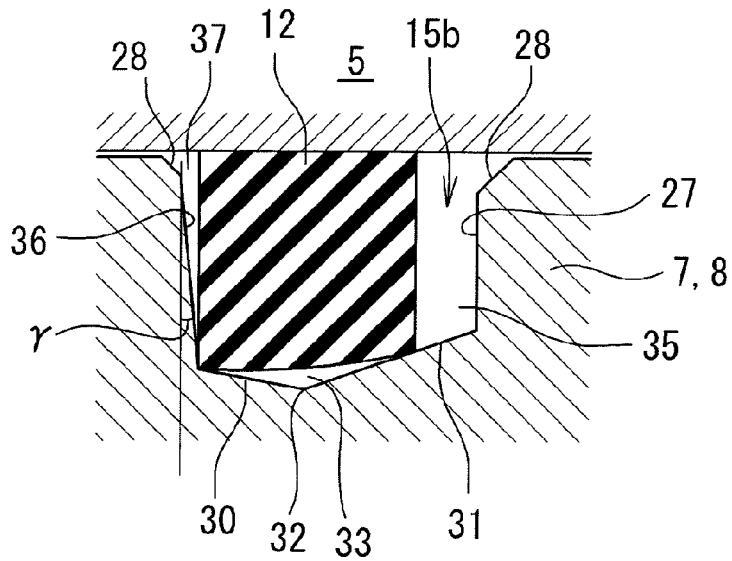
FIG. 5 is a sectional view showing the way in which the piston seal member is disposed in a seal groove according to a second embodiment of the present invention.

Next, a seal groove 15b for piston seal according to a second embodiment of the present invention will be explained with reference to FIG. 5. It should be noted that parts of the seal groove 15b similar to those of the seal groove 15a according to the foregoing first embodiment are denoted by the same reference numerals as used in the first embodiment, and that only the parts in which the seal groove 15b differs from the seal groove 15a will be explained in detail. In the seal groove 15b according to the second embodiment, as shown in FIG. 5, a cylinder-opening-side seal groove wall surface 36 of the seal groove 15b is slanted so that a gap 37 between the seal groove wall surface 36 and the cylinder-opening-side side surface of the piston seal member 12 gradually increases from the cylinder-opening-side end of the first slant portion 30, which is provided on the bottom surface of the seal groove 15b, toward the opening of the cylinder bore 11. In the second embodiment, the cylinder-opening-side seal groove wall surface 36 provided in the seal groove 15b is slanted at an angle γ in the range of from 0° to 5° with respect to the radial line of the cylinder bore 11. The slant angle is preferably set at 3°. It should be noted that the cylinder-bottom-side seal groove wall surface 27 of the seal groove 15b extends in the same direction as the radial line of the cylinder bore 11.

In the seal groove 15b according to the second embodiment, the piston seal member 12, when thermally expanded, undergoes volume change toward the gap 33 of triangular sectional configuration between the outer peripheral surface of the piston seal member 12 and the bottom surface of the seal groove 15b and also toward the gap 37 between the cylinder-opening-side side surface of the piston seal member 12 and the cylinder-opening-side seal groove wall surface 36. Therefore, the volume increase of the piston seal member 12 toward the cylinder-bottom-side gap 35 is more suppressed than in the case of the seal groove 15a according to the first embodiment. Accordingly, it is possible to suppress the movement of the piston 5 toward the cylinder bore bottom when the piston seal member 12 is thermally expanded by braking heat.

Figure 6:
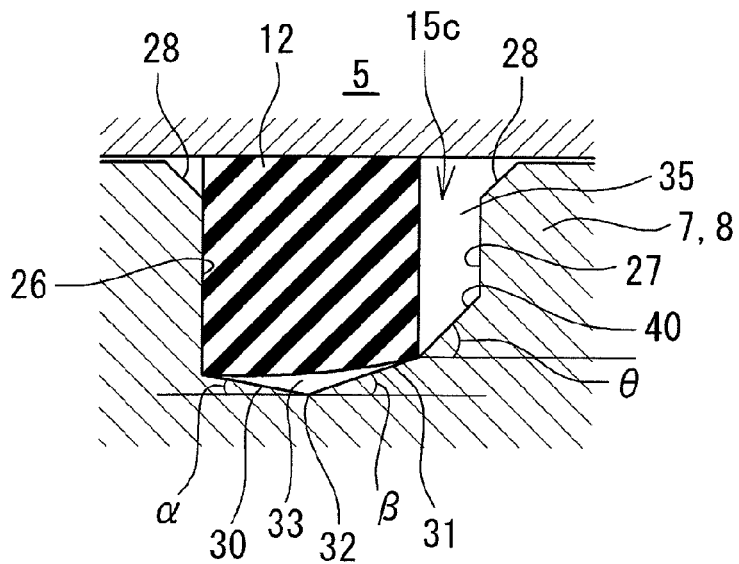
FIG. 6 is a sectional view showing the way in which the piston seal member is disposed in a seal groove according to a third embodiment of the present invention.

Next, a seal groove 15c for piston seal according to a third embodiment of the present invention will be explained with reference to FIG. 6. It should be noted that parts of the seal groove 15c similar to those of the seal groove 15a according to the foregoing first embodiment are denoted by the same reference numerals as used in the first embodiment, and that only the parts in which the seal groove 15c differs from the seal groove 15a will be explained in detail. As shown in FIG. 6, the seal groove 15c according to the third embodiment has a third slant portion 40 formed on the bottom surface thereof at a position closer to the cylinder bore bottom than the cylinder-bottom-side side surface of the piston seal member 12. The third slant portion 40 extends in a direction in which the diameter of the third slant portion 40 decreases from the cylinder-bottom-side end of the second slant portion 31 toward the bottom of the cylinder bore 11 in the axial direction thereof. The third slant portion 40 is configured so that the outer peripheral surface of the piston seal member 12 will not abut against the third slant portion 40 when the disk brake 1 is placed in the cold state, i.e. substantially at ordinary temperature, after the heat generated during braking has dissipated. The third slant portion 40 is connected to the cylinder-bottom-side seal groove wall surface 27. In other words, the third slant portion 40 is formed on a bottom portion of the seal groove 15c that faces the gap 35 between the cylinder-bottom-side side surface of the piston seal member 12 and the cylinder-bottom-side seal groove wall surface 27. In the third embodiment, the angle θ between the third slant portion 40 and the axis of the cylinder bore 11 is set at a value in the range of from 45° to 80°. The angle θ is preferably set at 68°. It should be noted that, in the third embodiment, the angles α, β and θ of the first, second and third slant portions 30, 31 and 40 with respect to the axis of the cylinder bore 11 are set so that the relationship of α<β<θ is satisfied. That is, the angle θ between the third slant portion 40 and the axis of the cylinder bore 11 is set larger than the angle β between the second slant portion 31 and the axis of the cylinder bore 11.

In the seal groove 15c according to the third embodiment, the piston seal member 12, when thermally expanded, undergoes volume change toward the gap 33 of triangular sectional configuration between the outer peripheral surface of the piston seal member 12 and the bottom surface of the seal groove 15c, and the third slant portion 40 blocks the volume change of the piston seal member 12 toward the bottom of the cylinder bore 11 in the axial direction thereof. Therefore, the volume increase of the piston seal member 12 toward the cylinder-bottom-side gap 35 is more suppressed than in the case of the seal groove 15a according to the first embodiment. Accordingly, it is possible to suppress the movement of the piston 5 toward the cylinder bore bottom when the piston seal member 12 is thermally expanded by braking heat.

Moreover, the seal groove 15c according to the third embodiment has the third slant portion 40 on the bottom surface thereof. Therefore, during the seal assembly, the piston seal member 12 can be stably positioned closer to the seal groove wall surface 26 of the seal groove 15c. Thus, it is possible to reduce piston stroke variations at the time of initially supplying the fluid pressure.

It is also possible to employ a seal groove obtained by properly combining together the configurations of the above-described seal grooves 15b and 15c according to the second and third embodiments, although the alternative seal groove is not shown in the figures.

Although in the foregoing first to third embodiments the present invention is applied to the disk brake 1 of the opposed piston type, by way of example, the present invention is not limited thereto but may also be applied to a floating caliper type disk brake in which the pistons 5 are disposed at only one side of the disk rotor 2.

As has been explained above, the disk brakes 1 according to the foregoing first, second and third embodiments have seal grooves 15a, 15b and 15c, respectively, which are each provided in a cylinder bore 11 slidably fitted with a piston 5. The seal grooves 15a, 15b and 15c are each fitted with a piston seal member 12. Each of the seal grooves 15a, 15b and 15c has at least a first slant portion 30 and a second slant portion 31 on the bottom surface thereof. The first slant portion 30 extends in a direction in which the diameter of the first slant portion 30 increases from a cylinder-opening-side seal groove wall surface 26, which is closer to the opening of the cylinder bore 11, toward the bottom of the cylinder bore 11 in the axial direction thereof. The second slant portion 31 extends in a direction in which the diameter of the second slant portion 31 decreases from the cylinder-bottom-side end of the first slant portion 30 toward the bottom of the cylinder bore 11 in the axial direction thereof. A gap 33 of triangular sectional configuration is formed between the outer peripheral surface of the piston seal member 12 and the first and second slant portions 30 and 31. A transition point 32 between the first slant portion 30 and the second slant portion 31 is located closer to the cylinder bore opening than the center in the cylinder bore axial direction of the seal groove 15a, 15b or 15c, and the transition point 32 is positioned substantially at the center in the cylinder bore axial direction of the piston seal member 12. Moreover, when the piston 5 is fitted in the cylinder bore 11, the surface pressure applied to the bottom surface of the seal groove 15a, 15b or 15c from the piston seal member 12 is higher at the cylinder-bottom-side end of the piston seal member 12 than at the cylinder-opening-side end thereof.

Thus, when the piston seal member 12 is thermally expanded, the volume change of the piston seal member 12 can be absorbed by the gap 33. Consequently, it is possible to suppress the volume change of the piston seal member 12 at a side thereof that contacts the piston 5. Thus, it is possible to suppress the movement of the piston 5 toward the cylinder bore bottom.

In the disk brakes 1 according to the foregoing first to third embodiments, the angle between the second slant portion and the axis of the cylinder bore is set larger than the angle between the first slant portion and the axis of the cylinder bore. Thus, the piston seal member 12, when fitted into the seal groove 15a, is always forced toward the seal groove wall surface 26. Accordingly, there is no possibility of the piston seal member 12 being moved within the seal groove 15a by fluctuations of the fluid pressure in the fluid pressure chamber 17, which enables an improvement in brake feeling in the early stages of braking.

In the disk brakes 1 according to the foregoing first to third embodiments, the seal groove is so formed that, when the piston is fitted in the cylinder bore, an interference is provided at least the axial cylinder-bottom-side end of the outer peripheral surface of the piston seal member. Thus, strain energy in the piston seal member is accumulated axially toward the opening of the cylinder bore. Accordingly, when thermally expanded, the piston seal member is suppressed from undergoing a volume increase toward the bottom of the cylinder bore in the axial direction of the piston seal member. Consequently, it is possible to reduce the amount of movement of the piston toward the cylinder bore bottom and hence possible to suppress the movement of the piston toward the cylinder bore bottom.

In the disk brakes 1 according to the foregoing first to third embodiments, the seal groove is so formed that, when the piston is fitted in the cylinder bore, interferences are provided for the piston seal member at both the axial ends of the outer peripheral surface of the piston seal member. Thus, when the braking heat of the piston seal member cools off after cancellation of braking, the piston seal member thermally shrinks toward the radial center from the radially outer peripheral side thereof by an amount corresponding to the volume increase by thermal expansion, which makes it possible to suppress the movement of the piston toward the cylinder bore opening. Accordingly, it is possible to suppress the occurrence of what is called dragging, i.e. a phenomenon that the piston is undesirably propelled by the piston seal member, causing the brake pad to contact the disk rotor, despite the fact that no braking operation is performed after the piston seal member has cooled down.

In the disk brake 1 according to the foregoing second embodiment, the cylinder-opening-side seal groove wall surface is slanted so that the gap between the seal groove wall surface and the cylinder-opening-side side surface of the piston seal member gradually increases from the bottom surface of the seal groove toward the opening of the cylinder bore. Accordingly, the piston seal member, when thermally expanded, undergoes volume change toward the gap of triangular sectional configuration between the outer peripheral surface of the piston seal member and the bottom surface of the seal groove and also toward the gap between the cylinder-opening-side side surface of the piston seal member and the cylinder-opening-side seal groove wall surface. Therefore, the volume increase of the piston seal member toward the cylinder-bottom-side gap is further suppressed. Accordingly, it is possible to suppress the movement of the piston toward the cylinder bore bottom when the piston seal member is thermally expanded by braking heat. It should be noted that the cylinder-opening-side seal groove wall surface need not always be slanted but may extend perpendicular to the axis of the cylinder bore.

The disk brake 1 according to the foregoing third embodiment has a third slant portion formed on the bottom surface of the seal groove at a position closer to the cylinder bore bottom than the cylinder-bottom-side side surface of the piston seal member. The third slant portion extends in a direction in which the diameter of the third slant portion decreases from the cylinder-bottom-side end of the second slant portion toward the bottom of the cylinder bore in the axial direction thereof. Thus, when the piston seal member is thermally expanded, the third slant portion blocks the volume change of the piston seal member toward the bottom of the cylinder bore in the axial direction thereof. Therefore, the volume increase of the piston seal member toward the cylinder-bottom-side gap is further suppressed. Accordingly, it is possible to suppress the movement of the piston toward the cylinder bore bottom when the piston seal member is thermally expanded by braking heat.

Thus, the disk brake according to each of the foregoing embodiments can suppress the movement of the piston toward the cylinder bore bottom when the piston seal member is thermally expanded.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-081741 filed on Mar. 31, 2010.

The entire disclosure of Japanese Patent Application No. 2010-081741 filed on Mar. 31, 2010 including specification, claims, drawings and summary is incorporated herein by reference in its entirety.

What is claimed is:

1. A disk brake comprising:
    brake pads disposed at sides opposite to each other across a disk rotor;
    a piston pressing the brake pad at least one side of the disk rotor against the disk rotor;
    a cylinder bore in which the piston is slidably fitted;
    a seal groove provided as an annular groove on an inner peripheral surface of a cylinder portion defining the cylinder bore; and
    a seal member having a rectangular sectional configuration, the seal member being fitted in the seal groove to seal between the piston and the cylinder bore;
    the seal groove having a bottom surface having:
    a first slant portion extending and increasing in diameter from a cylinder-opening-side seal groove wall surface of the seal groove, which is closer to an opening of the cylinder bore, toward a bottom of the cylinder bore in an axial direction of the cylinder bore; and
    a second slant portion provided closer to the bottom of the cylinder bore than the first slant portion and decreasing in diameter from the first slant portion toward the bottom of the cylinder bore in the axial direction;
    wherein a transition point between the first slant portion and the second slant portion is located closer to the opening of the cylinder bore than a center of the seal groove in the axial direction of the cylinder bore; and
    wherein, when no pressure is applied to the piston fitted in the cylinder bore, a gap is formed between an outer peripheral surface of the seal member and the bottom surface of the seal groove, and a surface pressure applied to the bottom surface of the seal groove from the seal member at a cylinder-bottom-side end of the seal member, which is closer to the bottom of the cylinder bore, by abutment of the seal member against the second slant portion is higher than a surface pressure applied to the bottom surface of the seal groove from the seal member at a cylinder-opening-side end of the seal member, which is closer to the opening of the cylinder bore, by abutment of the seal member against the first slant portion.

2. The disk brake of claim 1, wherein an angle between the second slant portion and an axis of the cylinder bore is larger than an angle between the first slant portion and the axis of the cylinder bore.

3. The disk brake of claim 2, wherein the first slant portion and the second slant portion have a rectilinear cross-section in the axial direction of the cylinder bore.

4. The disk brake of claim 1, wherein the seal member abuts at least a part thereof against the cylinder-opening-side seal groove wall surface.

5. The disk brake of claim 1, wherein the seal groove is so formed that, when the piston is fitted in the cylinder bore, an interference is provided at least an axial cylinder-bottom-side end portion of the outer peripheral surface of the seal member.

6. The disk brake of claim 5, wherein the seal groove is so formed that, when the piston is fitted in the cylinder bore, interferences are provided at both axial end portions of the outer peripheral surface of the seal member.

7. The disk brake of claim 1, wherein the cylinder-opening-side seal groove wall surface of the seal groove is slanted so that a gap between the cylinder-opening-side seal groove wall surface and a cylinder-opening-side side surface of the seal member, which is closer to the opening of the cylinder bore, increases from the bottom surface of the seal groove toward the opening of the cylinder bore.

8. The disk brake of claim 1, wherein the bottom surface of the seal groove further has a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore.

9. A disk brake comprising:
    a piston pressing at least one of brake pads disposed at sides opposite to each other across a disk rotor;
    a cylinder part having a cylinder bore in which the piston is slidably fitted; and
    a seal groove formed as an annular groove in the cylinder part to accommodate a seal member having a rectangular sectional configuration that seals between the piston and the cylinder bore, the seal member being accommodated with a gap between the seal member and a bottom surface of the seal groove;
    the bottom surface of the seal groove having:
    a first slant portion extending and increasing in diameter from an opening-side seal groove wall surface, which is closer to an opening of the cylinder bore, toward a bottom of the cylinder bore in an axial direction of the cylinder bore; and
    a second slant portion provided closer to the bottom of the cylinder bore than the first slant portion and decreasing in diameter from the first slant portion toward the bottom of the cylinder bore in the axial direction such that an angle between the second slant portion and an axis of the cylinder bore is larger than an angle between the first slant portion and the axis of the cylinder bore.

10. The disk brake of claim 9, wherein the first slant portion and the second slant portion have a rectilinear cross-section in the axial direction of the cylinder bore.

11. The disk brake of claim 9, wherein the seal member abuts at least a part thereof against the cylinder-opening-side seal groove wall surface.

12. The disk brake of claim 9, wherein the seal groove is so formed that, when the piston is fitted in the cylinder bore, an interference is provided at least an axial cylinder-bottom-side end portion of the outer peripheral surface of the seal member.

13. The disk brake of claim 12, wherein the seal groove is so formed that, when the piston is fitted in the cylinder bore, interferences are provided at both axial end portions of the outer peripheral surface of the seal member.

14. The disk brake of claim 9, wherein the cylinder-opening-side seal groove wall surface of the seal groove is slanted so that a gap between the cylinder-opening-side seal groove wall surface and a cylinder-opening-side side surface of the seal member, which is closer to the opening of the cylinder bore, increases from the bottom surface of the seal groove toward the opening of the cylinder bore.

15. The disk brake of claim 9, wherein the bottom surface of the seal groove further has a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore.

16. A disk brake comprising:
    a cylinder bore having a piston slidably fitted therein through a seal member accommodated in a seal groove, the piston pressing one of brake pads disposed at sides opposite to each other across a disk rotor;

the seal groove having a bottom surface having:

a first slant portion extending and increasing in diameter from an opening-side seal groove wall surface, which is closer to an opening of the cylinder bore, toward a bottom of the cylinder bore in an axial direction of the cylinder bore; and a second slant portion provided closer to the bottom of the cylinder bore than the first slant portion and decreasing in diameter from the first slant portion toward the bottom of the cylinder bore in the axial direction such that an angle between the second slant portion and an axis of the cylinder bore is larger than an angle between the first slant portion and the axis of the cylinder bore;

wherein a transition point between the first slant portion and the second slant portion is located closer to the opening of the cylinder bore than a center of the seal groove in the axial direction of the cylinder bore and positioned at an axial center of the seal member as the seal member being placed to abut at least a part thereof against the cylinder-opening-side seal groove wall surface;

wherein, when no pressure is applied to the piston fitted in the cylinder bore, a gap is formed between an outer peripheral surface of the seal member and the bottom surface of the seal groove, and a surface pressure applied to the bottom surface of the seal groove from the seal member at a cylinder-bottom-side end of the seal member, which is closer to the bottom of the cylinder bore, by abutment of the seal member against the second slant portion is higher than a surface pressure applied to the bottom surface of the seal groove from the seal member at a cylinder-opening-side end of the seal member, which is closer to the opening of the cylinder bore, by abutment of the seal member against the first slant portion.

17. The disk brake of claim 16, wherein the first slant portion and the second slant portion have a rectilinear cross-section in the axial direction of the cylinder bore.

18. The disk brake of claim 16, wherein the seal groove is so formed that, when the piston is fitted in the cylinder bore, an interference is provided at least an axial cylinder-bottom-side end portion of the outer peripheral surface of the seal member.

19. The disk brake of claim 16, wherein the seal groove is so formed that, when the piston is fitted in the cylinder bore, interferences are provided at both axial end portions of the outer peripheral surface of the seal member.

20. The disk brake of claim 16, wherein the bottom surface of the seal groove further has a third slant portion formed at a position closer to the bottom of the cylinder bore than a cylinder-bottom-side side surface of the seal member, which is closer to the bottom of the cylinder bore, the third slant portion extending in a direction in which a diameter of the third slant portion decreases from a cylinder-bottom-side end of the second slant portion, which is closer to the bottom of the cylinder bore;

wherein an angle between the third slant portion and the axis of the cylinder bore is larger than an angle between the second slant portion and the axis of the cylinder bore.

* * * * *